United States Patent [19]
Kaaden et al.

[11] Patent Number: 6,043,958
[45] Date of Patent: Mar. 28, 2000

[54] DEVICE FOR COARSE AND FINE POSITIONING OF A FIRST ELEMENT AND A SECOND ELEMENT RELATIVELY TO EACH OTHER

[75] Inventors: Juergen Kaaden, Villingen; Peter Mahr, Königsfeld; Klaus Oldermann, Villingen-Schwenningen, all of Germany

[73] Assignee: Deutsche Thomson-Brandt GmbH, Villingen-Schwenningen, Germany

[21] Appl. No.: 08/929,277

[22] Filed: Sep. 15, 1997

[30] Foreign Application Priority Data

Sep. 13, 1996 [EP] European Pat. Off. .............. 96401957

[51] Int. Cl.$^7$ ...................................................... G11B 5/55
[52] U.S. Cl. ............................................ 360/109; 360/106
[58] Field of Search ................................... 360/106, 109, 360/114; 369/13, 219, 220, 244, 215

[56] References Cited

U.S. PATENT DOCUMENTS

| | | | |
|---|---|---|---|
| 3,664,203 | 5/1972 | Pataki | 74/55 |
| 4,351,197 | 9/1982 | Carson | 74/89.22 |
| 4,423,446 | 12/1983 | Takahashi et al. | 360/106 |
| 4,566,049 | 1/1986 | Sims, Jr. et al. | 360/106 |
| 4,609,959 | 9/1986 | Rudi | 360/106 |
| 4,627,039 | 12/1986 | Meyer | 369/44 |
| 4,827,365 | 5/1989 | Ida | 360/106 |
| 5,280,402 | 1/1994 | Anderson et al. | 360/106 |
| 5,379,170 | 1/1995 | Schwarz | 360/109 |
| 5,434,732 | 7/1995 | Schwarz et al. | 360/109 |
| 5,519,554 | 5/1996 | Todd et al. | 360/106 |

FOREIGN PATENT DOCUMENTS

| | | |
|---|---|---|
| 0 069 547 A1 | 1/1983 | European Pat. Off. . |
| 0 160 447 | 11/1985 | European Pat. Off. . |
| 0 210 026 | 1/1987 | European Pat. Off. . |
| 0 529 930 A1 | 3/1993 | European Pat. Off. . |
| 0 556 436 A1 | 8/1993 | European Pat. Off. . |
| 0 565 918 A1 | 10/1993 | European Pat. Off. . |
| 0 617 412 A2 | 9/1994 | European Pat. Off. . |
| WO 81/00781 | 3/1981 | WIPO . |

*Primary Examiner*—Brian E. Miller
*Attorney, Agent, or Firm*—Oblon, Spivak, McClelland, Maier & Neustadt, P.C.

[57] ABSTRACT

The invention relates to a device for positioning a first element relatively to a second element. The device according to the invention uses lifting means comprising a cam element and actuator means to actuate the cam element. The cam element has a plurality of contiguously arranged sectors with machined edges belonging to first and second interleaved groups. The machined edges are shaped such that a response of the lifting means to the actuator means has different values for sectors of said first and second group thereby providing alternately a coarse positioning and a fine positioning. The device may for example be used to position a multitrack magnetic tape and a magnetic writing/reading head relatively to each other.

20 Claims, 6 Drawing Sheets

DEVICE FOR COARSE AND FINE POSITIONING OF A FIRST ELEMENT AND A SECOND ELEMENT RELATIVELY TO EACH OTHER

BACKGROUND OF THE INVENTION

1. Field of the Invention

In a system comprising two elements which are movable relatively to each other, at least one can be positioned along a predetermined direction relatively to the other, or both elements may be displaced along predetermined directions to be positioned relatively to each other a device is needed which provides for the displacements with a certain precision e.g. for a coarse and a fine positioning. As an example, in information storage and retrieval systems using a tape as an information storage medium, and a writing and/or reading head to store and/or retrieve the information from the tape it may be critical to precisely position the tape and the writing and/or reading head relatively to each other. More particularly in the case of magnetic tapes the information is usually stored in at least one longitudinal track on the tape. An active part of the magnetic head used to write and/or read a track, or any other device, e.g. a magneto-optic system to read a track, is coarse positioned on a track and fine positioned on the transverse center of the same track while the tape is being longitudinally transported. This problem has often been encountered in prior art and different solutions have been elaborated.

2. Discussion of Background

In a device shown in the U.S. Pat. No. 5,379,170 a recording/playback head is moved relatively to a magnetic tape in order to remain on the center of a track. The device comprises mechanisms which allow to perform a coarse and fine transverse head positioning. A stage actuated by a stepper motor driven lead screw provides for the coarse positioning. A pivotal arm mounted on the stage and actuated by a coil assembly provides a fine position control. The fine and coarse positioning mechanisms are clearly of distinct nature and use different actuators. The mechanical complexity of this prior art device is relatively high.

It is an object of the present invention to propose a solution for a single mechanism which allows to coarse and fine position a first element and a second element relatively to each other but which is more simple than in prior art.

SUMMARY OF THE INVENTION

According to the present invention, a device for positioning a first and a second element relatively to each other comprises lifting means for causing said first and said second element to variably position relatively to each other along a predetermined direction and actuator means for actuating said lifting means, said lifting means comprising a cam element actuated by said actuator means. The cam element may have a plurality of contiguously arranged sectors. Said sectors have machined edges for causing said first or second element to move. Said sectors belong to first and second interleaved groups. The machined edges are shaped such that a response of said lifting means to said actuator means has different values for sectors of said first and second group thereby providing alternately a coarse positioning and a fine positioning when said cam element is actuated in a predetermined direction. Successive positionings achieved by one of said groups, provide ranges of positioning which have no overlapping. An advantageous characteristic of the cam element is that it generates a displacement of an object which is a function both of a cam's structure cooperating with the object and of a motion of the actuator means transmitted to the cam element. A precision achieved in a coarse positioning and a fine positioning is achieved by the cam's structure and is not directly dependent on a precision of the actuator means, e.g. on a stepsize of a stepper motor.

Advantageously in an embodiment of a device according to the invention, the cam element may experience a translation movement. Also advantageously in another embodiment of a device according to the present invention, the cam element may experience a rotation movement. Thus the movement of the cam element may be adapted to either a translation or a rotation movement developed by the actuator means. More precisely, the actuator means do not need to comprise a device that develops a rotation movement like e.g. a rotating motor. A linear motor might also be used in appropriate cases.

BRIEF DESCRIPTION OF THE DRAWINGS

Further advantages of the invention will become apparent from the following description taken in connection with the accompanying drawings.

DETAILED DESCRIPTION OF THE PREFERRED EMBODIMENTS

It will be understood that the above listed FIGS. 1 to 7 and the following related description are given by way of example only and that variations and modifications can be effected within the spirit and scope of the invention.

For simplifying the explanation, the same elements are indicated with same reference numbers in FIGS. 1 to 7.

Figure 1:
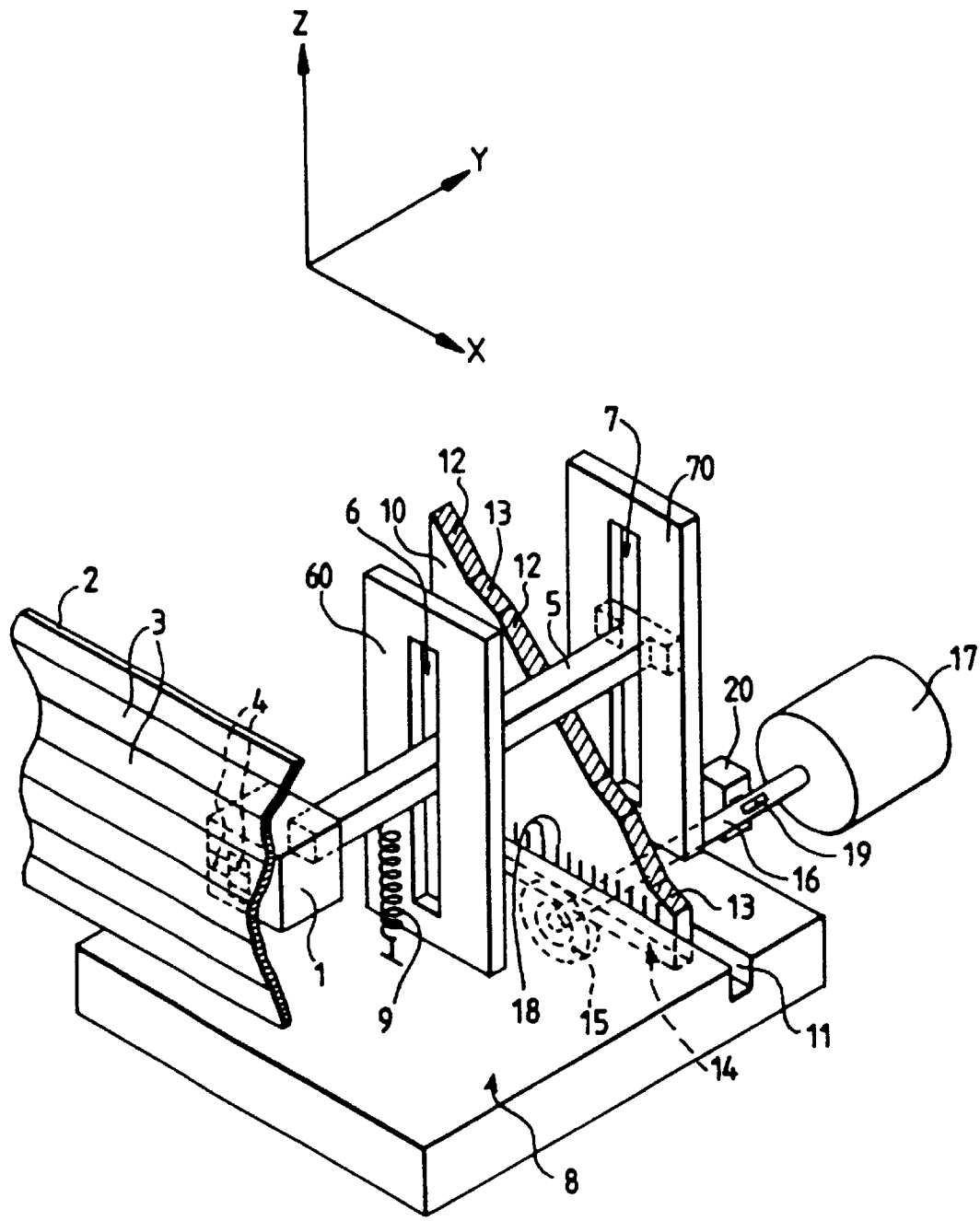
FIG. 1 is a schematic isometric view of a device according to the invention.

A device shown in FIG. 1 is an example of the embodiment for a device according to the invention. The device shown in FIG. 1 is used for traversely positioning a writing and/or reading head 1, i.e. a first element, relatively to a tape 2, i.e. a second element. The tape 2 carries a plurality of bundles 3 of longitudinal elementary tracks (not shown) which are written and/or read using active parts 4 of the magnetic head 1 when the tape 2 is transported in an X-direction. The magnetic head 1 is moved using lifting means.

The magnetic head 1 is mounted at an end of a T-shaped structure 5 which may slide in a Z-direction. The T-shaped structure 5 is guided in slits 6 and 7 of holders 60 and 70. The holders 60 and 70 are mounted on a base platform 8. A biasing spring 9 is at one end fixed on the base platform 8 and at the other end on the T-shaped structure 5. The biasing spring 9 continuously exercises a biasing force on the T-shaped structure 5 which tends to approach the magnetic head 1 to the base platform 8.

A cam element 10, made out of a plate, may slide in the Z-direction in a recess 11 of the base platform 8. The cam element 10 comprises contiguously arranged, alternating edge surfaces 12 and 13 machined for displacing the T-shaped structure 5. The edge surfaces 12 and 13 define sectors which belong to a first group containing the edge surfaces 12 and a second group containing the edge surfaces 13. A toothed rack 14 of the cam element 10 cooperates with a pinion 15 of actuator means. The pinion 15 is mounted at one end of a mechanical drive axis 16 which transmits a rotation movement of a motor 17. Thus an actuation of the motor 17 causes the cam element 10 to slide in the recess 11. At the same time the edge surfaces 12 and 13 slide on a counterpart contact element of the T-shaped structure 5 causing it to continuously move away from the base platform 8 or move towards it depending on the direction of rotation of motor 17. The counterpart contact element may for example simply be a counterpart surface of the T-shaped structure as shown in FIG. 1. It could alternatively also be realized using an articulated roller (not shown) mounted on the T-shaped structure 5 and minimizing friction with the edge surfaces 12 and 13.

The edge surfaces 12 belonging to the first group have a different inclination in the Z-direction than the edge surfaces 13 belonging to the second group causing different response values of the lifting means. This means for the configuration shown in FIG. 1 that as the pinion 15 effects one revolution, the displacement in Z-direction of the T-shaped structure 5 is greater when it is in contact with an edge surface 12 than when it is in contact with an edge surface 13. The edge surfaces 12 from the first group are used to achieve a coarse positioning of the magnetic head 1 and the edge surfaces 13 belonging to the second group for a fine positioning. Furthermore the edge surfaces 12 or the edge surfaces 13 are arranged such that successive positionings achieved by one group of edge surfaces have no overlapping.

Preferably, the device should be configured in a way that the magnetic head 1 is positioned substantially at the center of a bundle 3 when the T-shaped structure 5 is in contact with a middle of an edge surface 13, e.g. halfway between two adjacent edge surfaces 12. A distance separating the centers of two adjacent bundles 3 will preferably be the same as the distance measured on the edge surfaces which separates a middle of an edge surface 13 from a middle of the nearest consecutive edge surface 13. This distance corresponds to a macrostep.

The cam element 10 carries reference marks 18 which may be detected using an opto-electronic detector (not shown). A signal generated by the opto-electronic detector may be used to evaluate an instantaneous position of the magnetic head 1, which in turn may be used to determine an absolute or a relative position of the magnetic head 1 in the Z-direction. A monitoring mark 19 on the mechanical drive axis 16 may be detected using a further detector 20 to monitor the number of revolutions operated by the motor 17. A monitoring signal delivered by the detector 20 may be used to determine the instantaneous position of the magnetic head 1, and the relative or absolute position of the magnetic head 1 in Z-direction using appropriate means for evaluation (not shown). It is of course possible to increase the number of monitoring marks 19 to increase the accuracy of monitoring.

The whole device shown in FIG. 1 may be used in a tape recorder. Such a tape recorder may comprise tape guiding means, tape transportation means, take up and supply reels and all other peripheral devices needed to realize a tape recorder. More specifically the tape recorder may also comprise means for detecting a mistracking and servo means using an output of the means for detecting to control the actuator means in order to reduce and eventually eliminate mistracking.

Figure 2:
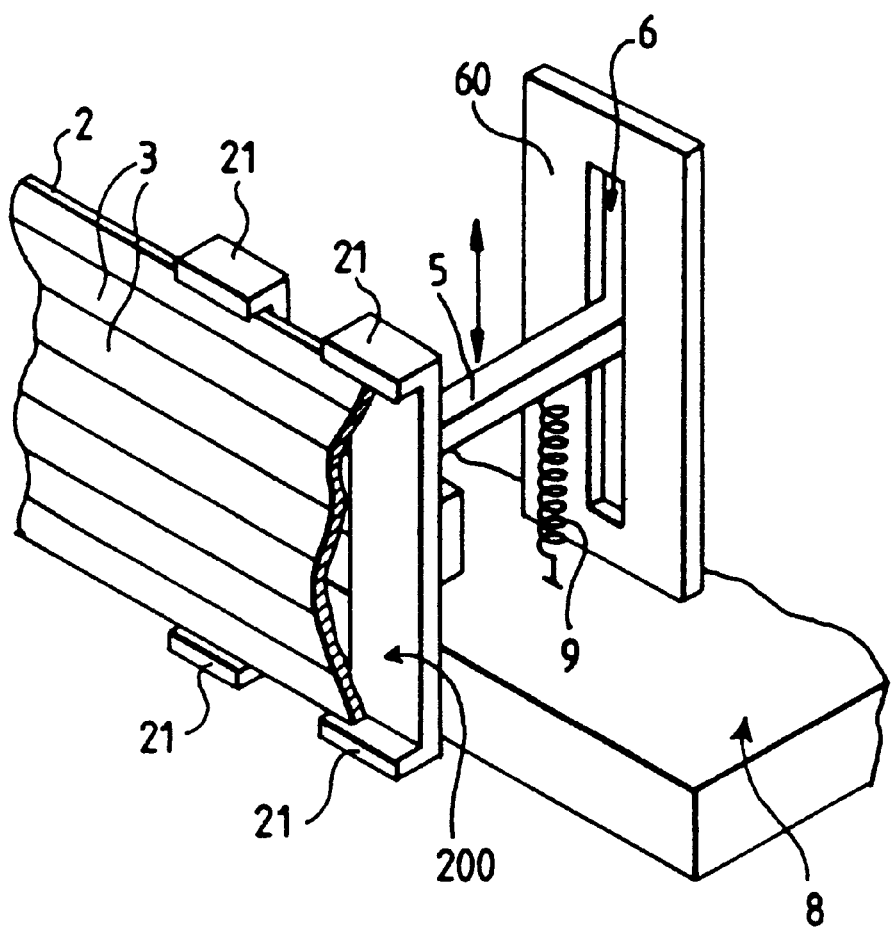
FIG. 2 is a schematic isometric view of a tape guide transversely positioned by a device according to the invention.

FIG. 2 shows an embodiment of the invention used for transversely displacing the tape 2. The device shown in FIG. 2 differs from the device shown in FIG. 1 in that the magnetic head 1 is substituted by a tape guide 200. The tape guide 200 may comprise two U-shaped elements with edges 21 which act on longitudinal edges of the tape 2. The tape guide 200 and the tape 2 are displaced at the same time as the T-shaped structure 5 is displaced in the Z-direction in slit 6. A magnetic tape recorder using the device as shown in FIG. 2 may typically have a writing and/or reading head on a side of the tape opposite to the side of the tape guide 20.

Figure 3:
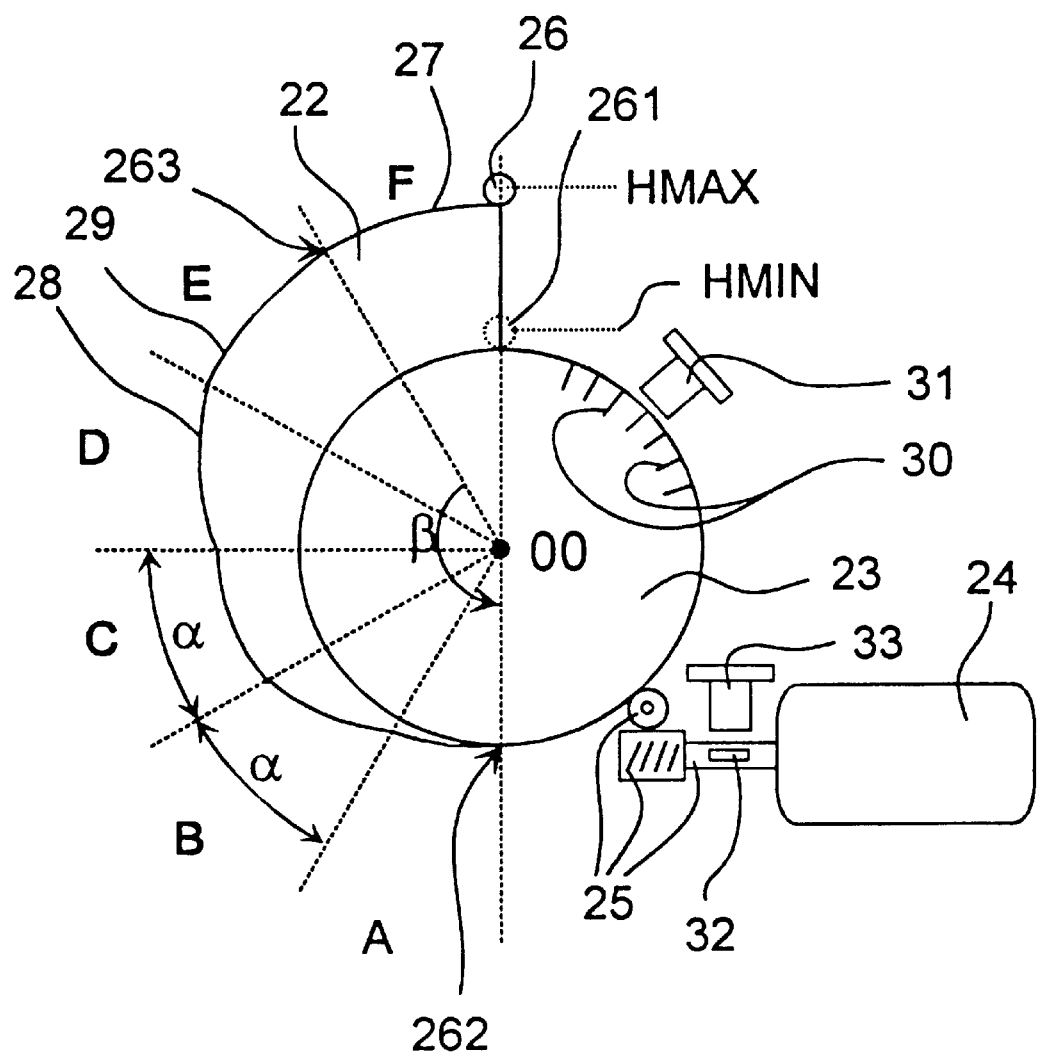
FIG. 3 shows a schematic front view of a cam element as used in a device according to the invention.

FIG. 3 shows a cam element 22 which may advantageously be used as an alternative to the cam element 10 shown in FIG. 1 in a device according to the invention. The cam element 22 which is mounted on a rotatable disc 23 experiences a rotation movement around a center 00 of disc 23 when actuated by a motor 24 through a worm gear 25. Schematically, a pin 26 belonging to the lifting means and having a similar function as the T-shaped structure 5 shown in FIG. 1 carries a writing and/or reading head or a tape guide (not shown). Using the cam element 22, the pin 26 shown in an extreme maximum position at a height HMAX may be positioned within a range extending to an extreme minimum position 261 at a height HMIN represented in dotted lines. The pin 26 is guided in its movement along a predetermined direction by a support having a slit and which is not shown in FIG. 3.

The cam element 22 comprises contiguously arranged sectors A to E which each span an angle α and have machined edges 28 (sectors D and B) and 29 (sectors A, C and E) which belong to a first group and a second group respectively. The cam element 22 further comprises a machined edge 27 which is shaped as a portion of a circle having it's center in 00. The machined edges 27, 28 and 29 cooperate with a counterpart contact element of the pin 26 by sliding on the counterpart contact element when the cam element 22 is actuated. A displacement of pin 26 responsive to a rotation of the disc 23 about an angle α depends on whether the counterpart contact element of pin 26 is in contact with a machined edge 28 of the first group or a machined edge 29 of the second group. In the configuration of FIG. 3 a machined edge 28 will be used for a coarse positioning, a machined edge 29 for a fine positioning.

By way of example, it is now explained how to move the pin 26 from a height HMIN to a height HMAX. At first the disc 23 is in a state such that the counterpart contact element of pin 26 is in contact with a machined edge 29 in sector A at a point 262, the pin 26 being positioned at a height HMIN. The disc 23 is rotated about an angle β using the actuator means until the counterpart contact element of pin 26 is in contact with the machined edge 29 in sector E at point 263, positioning the pin 26 at a height HMAX. The pin 26 remains at a constant height HMAX when the counterpart contact element is in contact with the machined edge 27.

Figure 4:
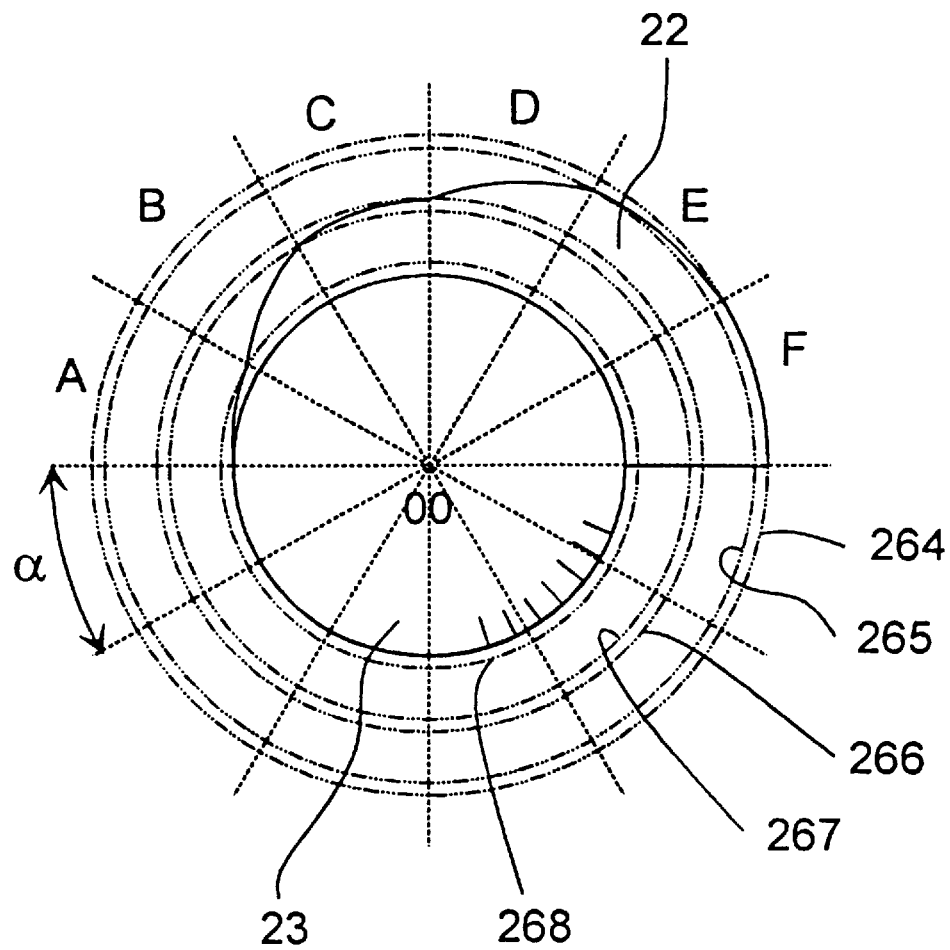
FIG. 4 shows a view of the cam element as used in FIG. 3.

FIG. 4 shows machined edges 28 and 29 of cam element 22 in sectors A to E and disc 23. Circles 264 to 268 have been drawn to better visualize a possible response of pin 26 (not shown) to the machined edges. The circle 264 to 268 are centered in 00. The machined edges A to E are delimited by the periphery of disc 23 and circles 264 to 268 as summarized in the following table:

| Machined edge | Lower limit | Upper limit |
|---|---|---|
| A | Periphery of disc 23 | 268 |
| B | 268 | 267 |
| C | 267 | 266 |
| D | 266 | 265 |
| E | 265 | 264 |

Figure 5:
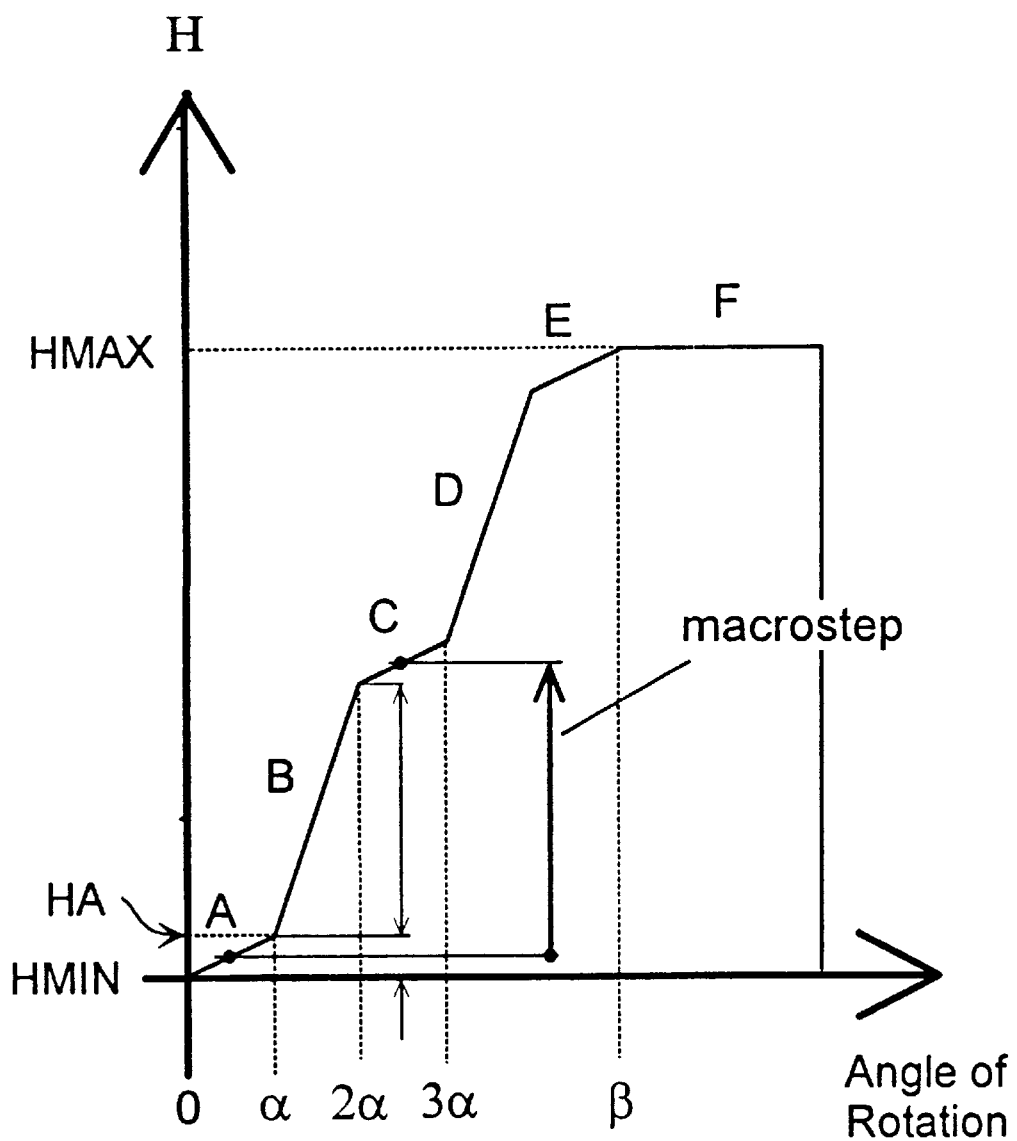
FIG. 5 shows a response of lifting means to actuator means.

FIG. 5 shows a response function which corresponds to the positioning at a height H of pin 26 as a result of a rotation of disc 23 about an angle of rotation. The positioning at a height H achieved using the machined edge in sector A and an angle of rotation comprised between 0 and α lies between heights HMIN and HA. The response function is linear in sector A to E and provides distinction between fine control (small slope of edges in sectors A, C and E) and coarse control (steep slope of edges in sectors B and E).

The rotatable disc 23 shown in FIG. 3 is also used as a position indicator carrying reference marks 30 at its periphery. The reference marks 30 may be detected using a detector 31 as the rotatable disc 23 is rotated. One or more further monitoring marks 32 on a worm gear axis at an output of the motor 24 may be monitored using a detector 33 when motor 24 is actuated. A monitoring signal generated by a detector 33 may be used to evaluate the relative or absolute position of pin 26.

All the above described configurations of a device according to the invention permit operation with a single motor 17 or 24 in the actuator means. The motor 17 or 24 may be a stepper motor. The coarse and fine positioning are compatible with a stepper motor having a single stepsize since a response amplitude of the lifting means during coarse and fine positioning depends also on characteristics of the different groups of sectors e.g. a degree of inclination. An advantageous structural configuration for the fine positioning sectors is one where there exists a proportional relationship between the actuator movement and the displacement of the lifting means.

Figure 6:
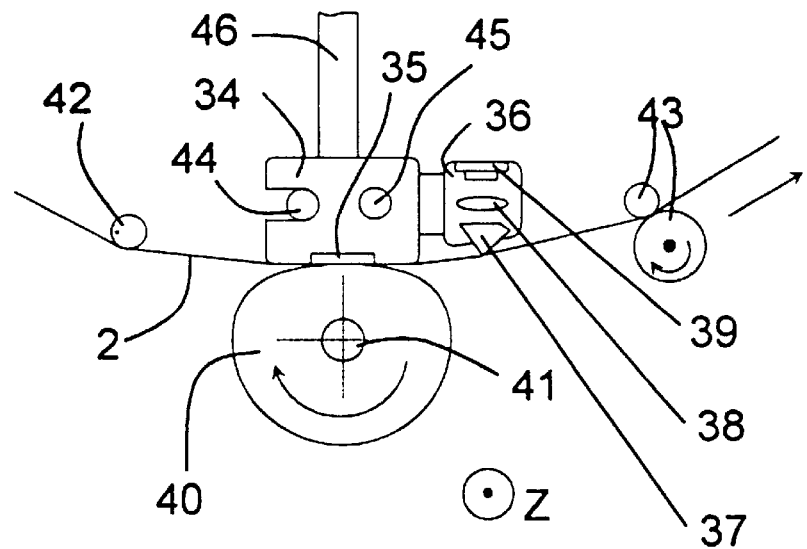
FIG. 6 is a schematic view of a head optical unit used to write and read a multitrack magnetic tape.

A device according to the invention may advantageously be used to displace a head optical unit 34 as shown in FIG. 6. The head optical unit 34 comprises a magnetic writing head 35 and an optical system 36. The magnetic head 35 is used for writing only. The optical system 36 is used for reading information and comprises a polarized light source (not shown), a magneto-optic transducer 37, focusing optics 38 and an imaging array 39. An elastic pressure roller 40 rotatable about an axis 41 is used to press the tape 2 against a surface of the magnetic head 35. A tape guiding pin 42 and a capstan mechanism 43 are part of means for tape transportation. The head optical unit 34 may be displaced transversely to the tape 2 along guiding pins 44 and 45. A support 46 mounted at a rear side of the head optical unit 34 is part of the lifting means and may have a counterpart contact element which cooperates with sectors of a cam element (not shown) to transversely position the head optical unit 44.

Figure 7:
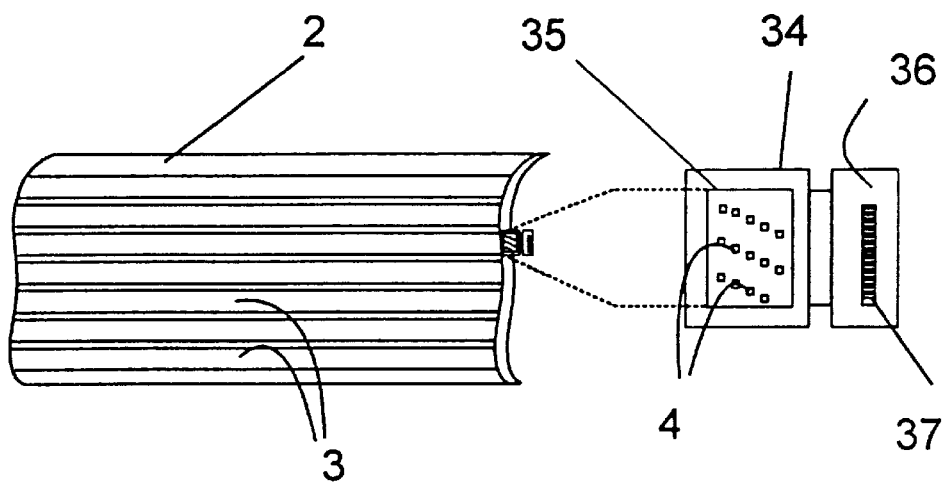
FIG. 7 is a schematic view of a tape sample and a magnified front view of a head optical unit.

A front view of the head optical unit 34 can be seen in FIG. 7. The magnetic head 35 comprises a plurality of active parts 4 on a planar surface. The active parts 4 are arranged in a two dimensional matrix. Each active part 4 is used to write in an elementary track (not shown) bundled in a bundle 3 on tape sample 2. The elementary tracks may be read using the optical system 36 when the magneto-optic transducer 37 is in contact with a bundle 3 of the tape 2.

The coarse positioning of the head optical unit 34 is done to displace the head optical unit from one bundle 3 to a next adjacent bundle 3 thereby substantially positioning the active parts 4 in front of the elementary tracks of the bundle 3. The fine positioning is used to precisely keep the active parts in register with the elementary tracks.

We claim:

1. A device for positioning a first and a second element relatively to each other, said device comprising lifting means for causing said first and said second element to variably position relatively to each other along a predetermined direction and actuator means for actuating said lifting means, wherein said lifting means comprise a cam element actuated by said actuator means, said cam element having a plurality of contiguously arranged sectors, each sector having only one smooth linear surface for causing said first or second element to move, said sector belonging to first and second interleaved and alternating groups, said linear surfaces being shaped such that a response of said lifting means to said actuator means has different values in said first and second groups thereby providing alternatively a coarse positioning in sectors belonging to said first group and a fine positioning in sectors belonging to said second group when said cam element is actuated in a predetermined direction, and that successive positionings achieved by one of said groups provide a series of separate positioning ranges.

2. A device according to claim 1 in which said first element is a magnetic tape and said second element is a writing and/or reading head, said lifting means causing said head to move along a direction transverse to said tape.

3. A device according to claim 2, characterized in that said linear surfaces are realized as cam surfaces cooperating with said lifting means, said cam surface being in contact with a counterpart contact element comprised in the lifting means.

4. A device according to claim 2, characterized in that said cam element experiences a translation movement when actuated by said actuator means.

5. A device according to claim 2, characterized in that said cam element experiences a rotation movement when actuated by said actuator means.

6. A device according to claim 1 in which said first element is a magnetic tape whose positioning is controlled by a tape guide and said second element is a writing and/or reading head, said lifting means causing said tape guide to move along a direction transverse to said tape.

7. A device according to claim 6, characterized in that said linear surfaces are realized as cam surfaces cooperating with said lifting means, said cam surface being in contact with a counterpart contact element comprised in the lifting means.

8. A device according to claim 6, characterized in that said cam element experiences a translation movement when actuated by said actuator means.

9. A device according to claim 6, characterized in that said cam element experiences a rotation movement when actuated by said actuator means.

10. A device according to claim 1 characterized in that said linear surfaces are realized as cam surface cooperating with said lifting means, said cam surfaces being in contact with a counterpart contact element comprised in the lifting means.

11. A device according to claim 10, characterized in that said cam element experiences a translation movement when actuated by said actuator means.

12. A device according to claim 1 characterized in that said cam element experiences a translation movement when actuated by said actuator means.

13. A device according to claim 1 characterized in that said cam element experiences a rotation movement when actuated by said actuator means.

14. A device according to claim 1 in which said response of said lifting means to said actuator means is linear in said first and said second groups.

15. A device according to claim 1 characterized in that said actuator means comprise a stepper motor for actuating said cam element.

16. A device according to claim 1 characterized in that it comprises a position indicator having a plurality of reference marks following a motion of the cam element and a detector to detect said reference marks and to supply a signal which represents an instantaneous position of said cam.

17. A device according to claim 9 wherein said detector is an opto-electronic sensor.

18. A device according to claim 1 characterized in that said actuator means comprise monitoring marks following a motion of said actuator means and monitoring means to monitor said monitoring marks and to supply a monitoring signal which represents the position of said cam element.

19. A device according to claim 18 in which said monitoring means comprise and opto-electronic sensor.

20. A multitrack magnetic tape recorder for writing and/or reading on a magnetic tape carrying a plurality of elementary tracks bundled in bundles, in which the writing head is a magnetic head comprising on a substantially planar surface a plurality of active parts arranged in a two-dimensional matrix, each active part being used to write in one elementary track at the time, and in which a readout of said elementary tracks is achieved using an optical system, said optical system being combined with said writing head in a head optical unit and comprising a polarized light source, a magneto-optical transducer and a linear optical sensor, said tape recorder comprising a device for transversely positioning said multitrack tape and said head optical unit relatively to each other, said device comprising lifting means for causing said multitrack magnetic tape and said head optical unit to variably position relatively to each other along a predetermined direction and actuator means for actuating said lifting means wherein said lifting means comprise a cam element actuated by said actuator means, said cam element having a plurality of contiguously arranged sectors, each sector having only one smooth linear surface for causing said multitrack magnetic tape or said head optical unit to move, said sectors belonging to first and second interleaved and alternated groups, said smooth linear surfaces being shaped such that a response of said lifting means to said actuator means has different values in said first and second groups thereby providing alternately a coarse positioning in sectors belonging to said first group and a fine positioning in sectors belonging to said second group when said cam element is actuated in a predetermined direction, and that successive positionings achieved by one of said groups provide a series of separate positioning ranges.

* * * * *